J. FOSTER.
VALVE.
APPLICATION FILED AUG. 30, 1913.

1,147,387.

Patented July 20, 1915.

Witnesses

Inventor
John Foster
By
Fred B. Fetherstonhaugh
His Attorney

UNITED STATES PATENT OFFICE.

JOHN FOSTER, OF MONTREAL, QUEBEC, CANADA.

VALVE.

1,147,387.

Specification of Letters Patent.  Patented July 20, 1915.

Application filed August 30, 1913. Serial No. 787,516.

*To all whom it may concern:*

Be it known that I, JOHN FOSTER, a subject of the King of Great Britain, residing at the city of Montreal, in the Province of Quebec and Dominion of Canada, have invented certain new and useful Improvements in Valves, of which the following is a full, clear, and exact description.

This invention relates to improvements in high pressure valves, and is particularly designed for use in discharging pulp from digester tanks under heavy pressure.

The object of the invention is to provide means for taking up wear between the closure member and body of the valve, so that leakage past the valve when in either closed or open position is prevented.

A further object is to provide a valve of extremely strong and durable structure, which will not blow out.

Figure 1:
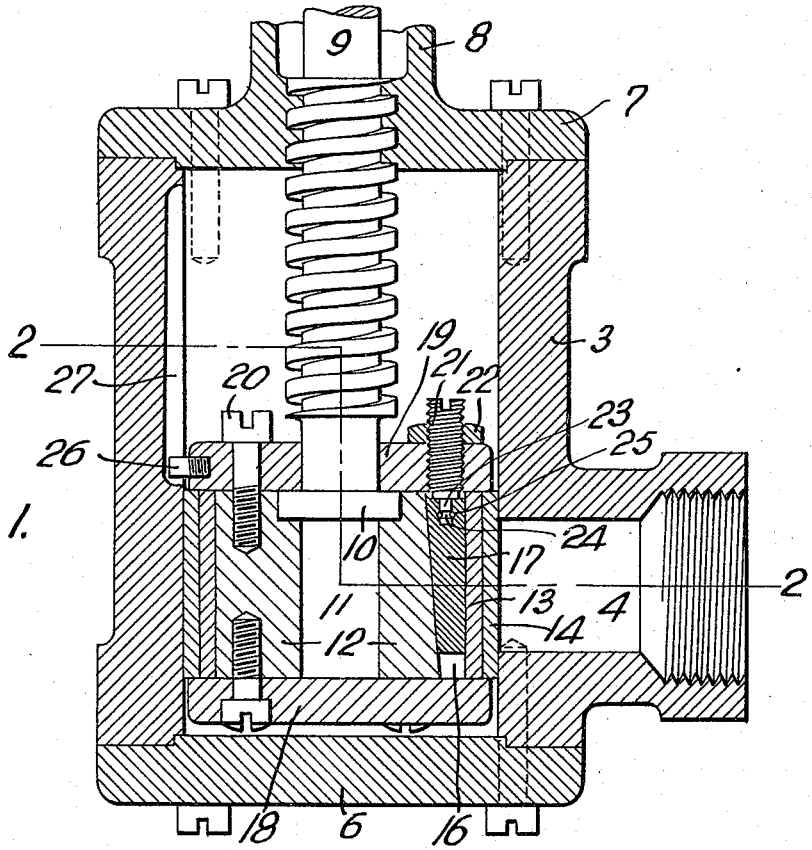
Figure 2:
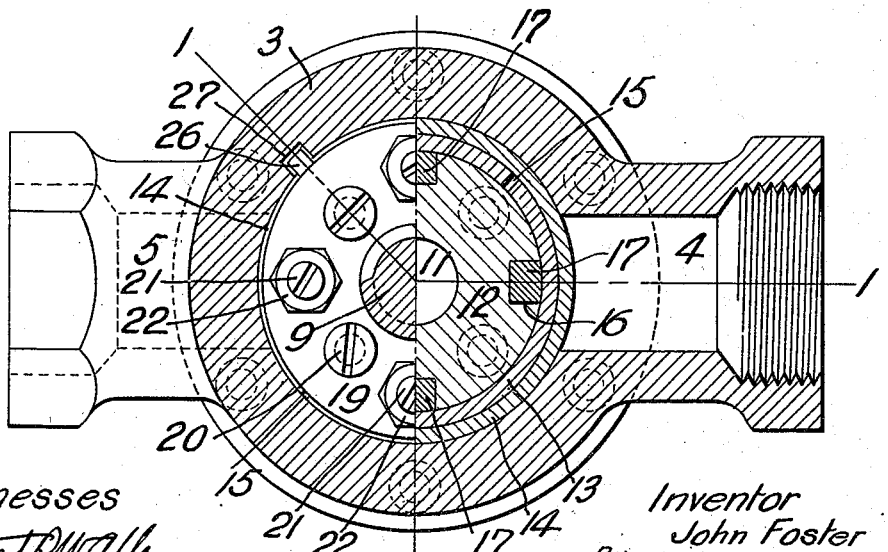

In the drawings which illustrate the invention:—Figure 1 is a vertical sectional view on the line 1—1, Fig. 2. Fig. 2 is a horizontal sectional view on the line 2—2, Fig. 1.

Referring more particularly to the drawings, 3 designates the body of the valve having inlet and outlet passages 4 and 5 respectively. The body 3 is of substantially cylindrical form, as clearly shown, and the inlet and outlet passages are arranged diametrically opposite near the bottom of the body. The bottom of the body is closed by a cap 6 and the top by a cap or bonnet 7 having a neck 8, to which a stuffing gland or the like may be attached. The bonnet is internally threaded to coöperate with the threaded spindle 9, which is provided at its lower end with a shoulder 10 engaging the valve closure member, which is generally designated by the numeral 11, so that this closure member will rise and fall with the spindle.

The closure member comprises a cylindrical core 12 surrounded by concentric sleeves 13 and 14 respectively, each of which is split in a direction substantially parallel with the axis, these splits, designated 15, being arranged on opposite sides of the axis, as clearly shown in Fig. 2. A plurality of grooves 16 are formed in the curved surface of the cylinder parallel with the axis thereof and arranged equidistantly. These grooves taper slightly from top to bottom, and each contains a correspondingly tapered wedge 17 slightly shorter than the groove. The sleeves and wedges are kept in place on the core 12 by bottom and top plates 18 and 19 respectively, which are secured to the core by cap screws 20. Each of the wedges 17 is provided with an adjusting screw 21 operating through the top plate 19, and having a lock nut 22. The lower end of the screws 21 engaging the wedges may be connected thereto by any suitable means, such as a pin 23 of reduced diameter entering the wedge. This pin may be provided with a groove 24 engaged by a small key 25 mounted in the wedge. The upper plate 19 is also provided with one or more radially projecting pins 26 engaging in vertical grooves 27 formed in the inner surface of the body. These pins obviously operate to hold the closure member against rotation in the body.

The operation of the device will be readily understood from the drawings. When the valve is closed, as shown, the closure member occupies the lower part of the casing. When the spindle is rotated, the threads thereof cause it to rise and draw with it the closure member. If there should be any leakage between the closure member and body, the bonnet 7 is removed and each of the screws 21 turned a sufficient amount. This forces the wedges downwardly in the tapered slots and expands the inner sleeve 13, which in turn expands the outer sleeve 14 into closer engagement with the body. When the desired adjustment has been obtained, the adjusting screws 21 are locked by means of the nuts 22. When the screws 21 are turned in the reverse direction, the connection between them and the wedges causes the latter to be drawn upwardly, thus relaxing the sleeves which contract.

Having thus described my invention, what I claim is:—

1. In a valve, a casing, a cylindrical body slidable therein having tapering grooves parallel with the body axis, concentric split sleeves surrounding said body, members slidable in said grooves, and adjusting means in the body revolubly connected with said members and adapted to move the same longitudinally in the grooves.

2. In a valve, a casing, a cylindrical body slidable therein having tapering grooves parallel with the body axis, concentric split sleeves surrounding said body, wedges slidable in the body grooves, and adjusting screws in the body revolubly connected with said wedges and adapted to move the same longitudinally in the body grooves.

3. In a valve, a grooved casing having a fluid passage therethrough, a closure member controlling flow through said passage comprising a cylindrical body, split sleeves surrounding said body formed concentric therewith, tapering channels in said body formed parallel with the axis thereof, wedges in said channels adapted to expand said sleeves, adjusting screws operating in the body to move said wedges in axial direction, means for locking said screws, and means for holding the closure member against revolution in the casing.

In witness whereof, I have hereunto set my hand in the presence of two witnesses.

JOHN FOSTER.

Witnesses:
C. W. TAYLOR,
G. M. MORELAND.

Copies of this patent may be obtained for five cents each, by addressing the "Commissioner of Patents. Washington, D. C."